__US010075107B2__

United States Patent
Lepka et al.

(10) Patent No.: US 10,075,107 B2
(45) Date of Patent: Sep. 11, 2018

(54) METHOD AND APPARATUS FOR MOTOR LOCK OR STALL DETECTION

(71) Applicant: Freescale Semiconductor, Inc., Austin, TX (US)

(72) Inventors: Jaroslav Lepka, Frenatat pod Radhostem (CZ); Libor Prokop, Brno (CZ)

(73) Assignee: NXP USA, Inc., Austin, TX (US)

(*) Notice: Subject to any disclaimer, the term of this patent is extended or adjusted under 35 U.S.C. 154(b) by 164 days.

(21) Appl. No.: 14/930,904

(22) Filed: Nov. 3, 2015

(65) Prior Publication Data

US 2017/0126153 A1    May 4, 2017

(51) Int. Cl.
| | |
|---|---|
| H02P 6/12 | (2006.01) |
| H02P 29/02 | (2016.01) |
| H02P 6/18 | (2016.01) |
| H02P 29/024 | (2016.01) |

(52) U.S. Cl.
CPC .............. *H02P 6/12* (2013.01); *H02P 6/18* (2013.01); *H02P 29/021* (2013.01); *H02P 29/024* (2013.01); *H02P 29/0241* (2016.02)

(58) Field of Classification Search
CPC .... H02P 6/14; H02P 6/001; H02P 6/12; H02P 6/22; H02H 7/093
USPC ..................................................... 318/400.21
See application file for complete search history.

(56) References Cited

U.S. PATENT DOCUMENTS

| | | | |
|---|---|---|---|
| 7,042,180 B2 | 5/2006 | Terry et al. | |
| 7,190,131 B2 | 3/2007 | Oh et al. | |
| 8,432,112 B2 | 4/2013 | Henderson et al. | |
| 8,860,345 B2 | 10/2014 | Boscariol et al. | |
| 2005/0029976 A1* | 2/2005 | Terry ..................... | F04B 35/04 318/400.21 |

(Continued)

FOREIGN PATENT DOCUMENTS

| | | |
|---|---|---|
| DE | 102006008497 A1 | 8/2006 |
| EP | 1760875 A1 | 3/2007 |

(Continued)

OTHER PUBLICATIONS

Freescale Semiconductor, Inc., Advanced Control Library, User Reference Manual, 56800E Digital Signal Controller, Rev. 2, May 2011.

(Continued)

*Primary Examiner* — Kawing Chan
*Assistant Examiner* — Bradley Brown (57) ABSTRACT

A method and apparatus are provided for detecting a rotor lock condition in a sensorless permanent magnet synchronous motor. A BEMF observer determines an estimated rotor speed $\hat{\omega}$ and a first BEMF voltage value in an estimated rotor-related $\gamma,\delta$ reference frame. In addition, a second estimated BEMF voltage value is calculated in a rotor-related d,q reference frame based on at least a first motor constant and an estimated rotor speed $\hat{\omega}$. After generating a BEMF error filter value from the first and second estimated BEMF voltage values and calculating a BEMF error threshold value as a function of the estimated rotor speed $\hat{\omega}$ that is subject to a minimum threshold BEMF value, a rotor lock condition is detected based on at least the BEMF error filter value and the BEMF error threshold value.

21 Claims, 6 Drawing Sheets

(56) References Cited

U.S. PATENT DOCUMENTS

| | | |
|---|---|---|
| 2006/0193090 A1 | 8/2006 | Ho |
| 2009/0153093 A1 | 6/2009 | Pinewski et al. |
| 2011/0068724 A1 | 3/2011 | Henderson et al. |
| 2011/0074327 A1* | 3/2011 | Paintz .................. H02P 25/03 318/400.35 |
| 2013/0043816 A1* | 2/2013 | Welchko ............... H02P 27/08 318/400.21 |
| 2013/0049661 A1* | 2/2013 | Cao ....................... H02P 21/28 318/400.34 |
| 2014/0097777 A1* | 4/2014 | Leong ..................... G01P 3/44 318/430 |
| 2014/0217944 A1* | 8/2014 | Yang ...................... H02P 6/18 318/400.34 |

FOREIGN PATENT DOCUMENTS

| JP | 3797508 B2 | 7/2006 |
|---|---|---|
| KR | 20040036364 A | 4/2004 |

OTHER PUBLICATIONS

Bob Hu, Cypress, PSoc 4 Sensorless Field-Oriented Control (FOC), AN93637, 2015.

Freescale Semiconductor, Inc., Sensorless PMSM Control for an H-axis Washing Machine Drive, Designer Reference Manual, MC56F8013/23/25 Digital Signal Controller, DRM110, Rev. 0, Feb. 2010.

Kwang-Woon Lee et al., Evaluation of Back-EMF Estimators for Sensorless Control of Permanent Magnet Synchronous Motors, Journal of Power Electronics, vol. 12, No. 4, Jul. 2012.

Charlie Wu, Freescale Semiconductor, Inc., Introduction of ACIM and PMSM Motor Control, FTF-IND-F0487, Jun. 2010.

Ward Brown: "Brushless DC Motor Control Made Easy", Microchip, AN857, Microchip Technology Inc., 2002-2011, pp. 1-48.

* cited by examiner

METHOD AND APPARATUS FOR MOTOR LOCK OR STALL DETECTION

BACKGROUND OF THE INVENTION

Field of the Invention

The invention relates generally to the field of electric motors. In one aspect, the present invention relates to sensorless permanent magnet synchronous motors (PMSM) and application safety.

Description of the Related Art

Permanent Magnet Synchronous Motors (PMSM) or Brushless DC (BLDC) motors are increasingly popular electric motor design which replaces wear-prone brushed DC motors with an electronic controller that improves the reliability of the unit and reduces the footprint and size, making such PMSM or BLDC motors suitable for applications where space is tight. However, the absence of mechanical or electrical contact between the stator and rotor of the PMSM or BLDC motors presents challenges with determining the relative positions of the component parts. One position-indicating arrangement is to use sensors (e.g., incremental encoders) to detect a motor component position status as part of the motor control function, but such sensors add cost and increase complexity (due the additional sensors, wiring, connectors, soldering, etc.), reduce reliability (due in part to the sensor connectors that are prone to contamination from dirt and humidity), and are not suitable for applications (e.g., where the rotor is in closed housing and the number of electrical entries must be kept to a minimum, such as in a compressor, or in applications where the motor is immersed in a liquid such as some pumps). To address such shortcomings, sensorless motor control techniques may be used to detect a motor component position status. For example, one position-indicating arrangement is to detect the potential or electromotive force (EMF) generated in the windings which gives rise to secondary magnetic field that opposes the original change in magnetic flux driving the motor's rotation. In resisting the motor's natural movement, the EMF is referred to as a "back" EMF. However, sensorless motor control techniques have a drawback that the rotor mechanical block or stall condition may not be recognized by the sensorless algorithm. The inability to detect a locked or stopped rotor presents potential application safety concerns which are increasingly required for household motor control application standards, such as IEC 60730 ("Automatic electrical controls for household and similar use") or IEC 60335-1 ("House and Similar Electrical appliances"). As a result, the existing solutions for detecting locked rotor conditions are extremely difficult at a practical level.

BRIEF DESCRIPTION OF THE DRAWINGS

The present invention may be understood, and its numerous objects, features and advantages obtained, when the following detailed description is considered in conjunction with the following drawings.

DETAILED DESCRIPTION

A sensorless motor control method and apparatus are described for detecting a stalled or locked rotor (a.k.a., motor lock, blocked motor) to reliably and efficiently provide safety protection to address various problems in the art where limitations and disadvantages of conventional solutions and technologies will become apparent to one of skill in the art after reviewing the remainder of the present application with reference to the drawings and detailed description provided herein. In selected embodiments, a software-based method and apparatus are provided for detecting the locked rotor of a permanent magnet synchronous motor (PMSM) by using a BEMF observer system to generate estimated BEMF and speed quantities (e.g., an estimated rotor angular speed value $\hat{\omega}$ and a first estimated BEMF voltage value $\hat{e}_\delta$). Based on the estimated BEMF and speed quantities, a locked rotor fault detector may implement a sensorless field-oriented control algorithm which computes a BEMF error threshold value ($BEMF_{ErrorThreshold}$) and a filtered BEMF difference value ($BEMF_{ErrorFilt}$) for processing with the estimated rotor angular speed value $\hat{\omega}$ at a fault handler. For example, a second estimated BEMF voltage value $\hat{e}_q$ may be computed from specified motor constant values and the estimated rotor angular speed value $\hat{\omega}$, and then subtracted from the first estimated BEMF voltage value $\hat{e}_\delta$ to generate a filtered BEMF difference value ($BEMF_{ErrorFilt}$) In addition, the BEMF error threshold value ($BEMF_{ErrorThreshold}$) may be computed as the product of a BEMF threshold coefficient ($C_{BEMFThresholdCoef}$) and the absolute value of the estimated rotor angular speed value $\hat{\omega}$, subject to a first minimum threshold BEMF value ($C_{BEMFThresholdMin}$). Since the locked rotor fault detector computations are based on electrical parameters for the estimated BEMF and speed quantities that can be measured in a motor control circuit without using sensors, the detection processing can, for example, be located remotely from the motor, such by executing an interrupt service routine on a microcontroller or microprocessor unit. In addition, the method and apparatus can be used to comply with safety standards without the need for sensors in the electric motor to verify proper operation of the motor.

Figure 1:
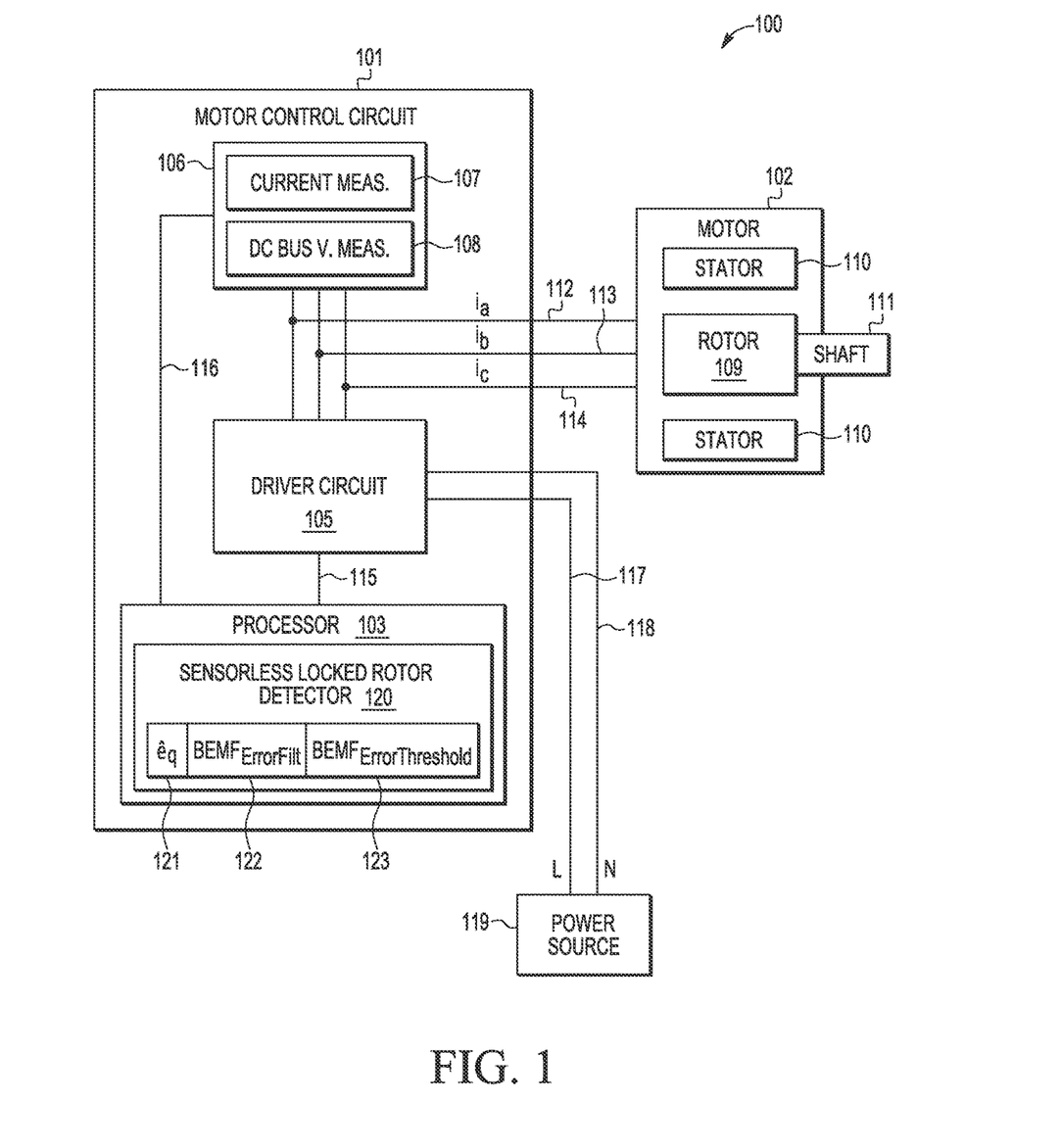
FIG. 1 is a block diagram illustration of an electric motor system comprising a motor control circuit utilizing a sensorless locked rotor detector in accordance with selected embodiments of the present disclosure.

Referring now to FIG. 1, there is shown a block diagram illustration of an electric motor system 100 which uses a sensorless locked rotor detector 120 in accordance with selected embodiments of the present disclosure. The electric motor system 100 includes motor control circuit 101, motor 102, and power source 119. Motor control circuit 101 includes a processor 103, driver circuit 105, and measurement circuits 106. Processor 103 includes the sensorless locked rotor detector 120 which may be implemented in hardware or in software by accessing or including memory which stores the sensorless locked rotor detector 120. In whatever form implemented, the sensorless locked rotor detector 120 may include a first calculation module 121 for computing a second estimated BEMF voltage value $\hat{e}_q$ as the q coordinate component of an estimated BEMF value. In addition, the sensorless locked rotor detector 120 may include a second calculation module 122 for computing a filtered BEMF difference value ($BEMF_{ErrorFilt}$) as the filtered difference between the first estimated BEMF voltage value $\hat{e}_\delta$ and the second estimated BEMF voltage value $\hat{e}_q$. In addition, the sensorless locked rotor detector 120 may include a third calculation module 123 for computing a BEMF error threshold value ($BEMF_{ErrorThreshold}$) as a function of the estimated rotor angular speed value ω, subject to a minimum or baseline threshold BEMF value ($C_{BEMFThresholdMin}$).

Measurement circuits 106 may include a current measurement circuit 107 and a direct current (DC) bus voltage measurement circuit 108. Motor 102 includes a rotor 109, stator 110, and shaft 111. Shaft 111 is mechanically coupled to rotor 109. Windings are disposed within motor 102. For example, stator windings may be provided to create a magnetic field in stator 110. As another example, rotor windings may be provided to create a magnetic field in rotor 109. As will be appreciated, the rotor windings act like a generator as they cut through magnetic field lines, generating a potential in the windings that is called an electromotive force (EMF). According to Lenz's law, this EMF gives rise to secondary magnetic field that opposes the original change in magnetic flux driving the motor's rotation. In simpler terms, the EMF resists the motor's natural movement and is referred to as a "back" EMF. For a given motor of fixed magnetic flux and number of windings, the magnitude of the EMF is proportional to the angular velocity of the rotor. Manufacturers of PMSM or BLDC motors specify a parameter known as the back EMF constant that can be used to estimate back EMF for a given speed. The potential across a winding can be calculated by subtracting the back EMF value from the supply voltage. Motors are designed such that when they are running at rated speed, the potential difference between the back EMF and supply voltage will cause the motor to draw the rated current and deliver the rated torque.

Motor control circuit 101 is connected to motor 102 via one or more conductors 112, 113, and 114. Conductor(s) 112, 113, and 114 are connected to outputs of driver circuit 105 and to inputs of measurement circuits 106. Measurement circuits 106 are connected to processor 103 via one or more connection lines 116 to provide measurements from measurement circuits 106 to processor 103. Processor 103 is connected to driver circuit 105 via one or more connection lines 115 to allow processor 103 to control driver circuit 105. Power source 119 is connected to driver circuit 105 via a line (L) conductor 117 and neutral (N) conductor 118 to provide power for driver circuit 105 to apply to motor 102. Alternatively, the power source can be provided with more than 2 line outputs, for example 3-phase system with 3 (L1, L2, L3) or four lines (L1, L2, L3, N).

Measurement circuits 106 can obtain measurements of parameters of motor 102. Current measurement circuit 107 can obtain one or more current measurements of motor 102, such as $i_a$, $i_b$ and $i_c$. In similar fashion, DC bus voltage measurement circuit 108 can obtain one or more voltage measurements of motor 102. Each of current measurement circuit 107 and DC bus voltage measurement circuit 108 can obtain a plurality of measurements, for example, with respect to the plurality of conductors 112, 113, and 114. Thus, for example, single phase and multiple phase (e.g., three-phase) motors can be controlled. Measurements can be, for example, complex measurements, which can include a direct component and a quadrature component sampled 90 degrees of phase away from the direct component. Magnetic components of motor 102, such as rotor 109 and stator 110, can include permanent magnetic components and electromagnetic components or entirely electromagnetic components.

Electric motor system 100 can be implemented to control operation of various types of motors 102, such as DC permanent magnet synchronous motors (PMSM), brushless DC (BLDC) motors, switched reluctance (SR) motors, AC induction motors (ACIM), and other motor types. Different control instructions can be executed by processor 103 to accommodate different motor types, for example, using field oriented control (FOC), voltage-over-frequency (V/Hz), and slip control. Different components can be used in driver circuit 105 to drive different motor types. For example, components compatible with voltages of different polarities can be used to implement driver circuit 105 for AC motors. Different components can be used in measurement circuits 106 to measure currents and voltages of different motor types. In the case of an alternating current (AC) motor, measurement circuits 106 can be capable of measuring AC signals. As an example, an AC bus voltage measurement circuit may be used in place of DC bus voltage measurement circuit 108. In accordance with at least one embodiment, DC bus voltage measurement circuit 108 may be implemented generally as a voltage measurement circuit not specifically limited to DC or AC voltage measurement.

Figure 2:
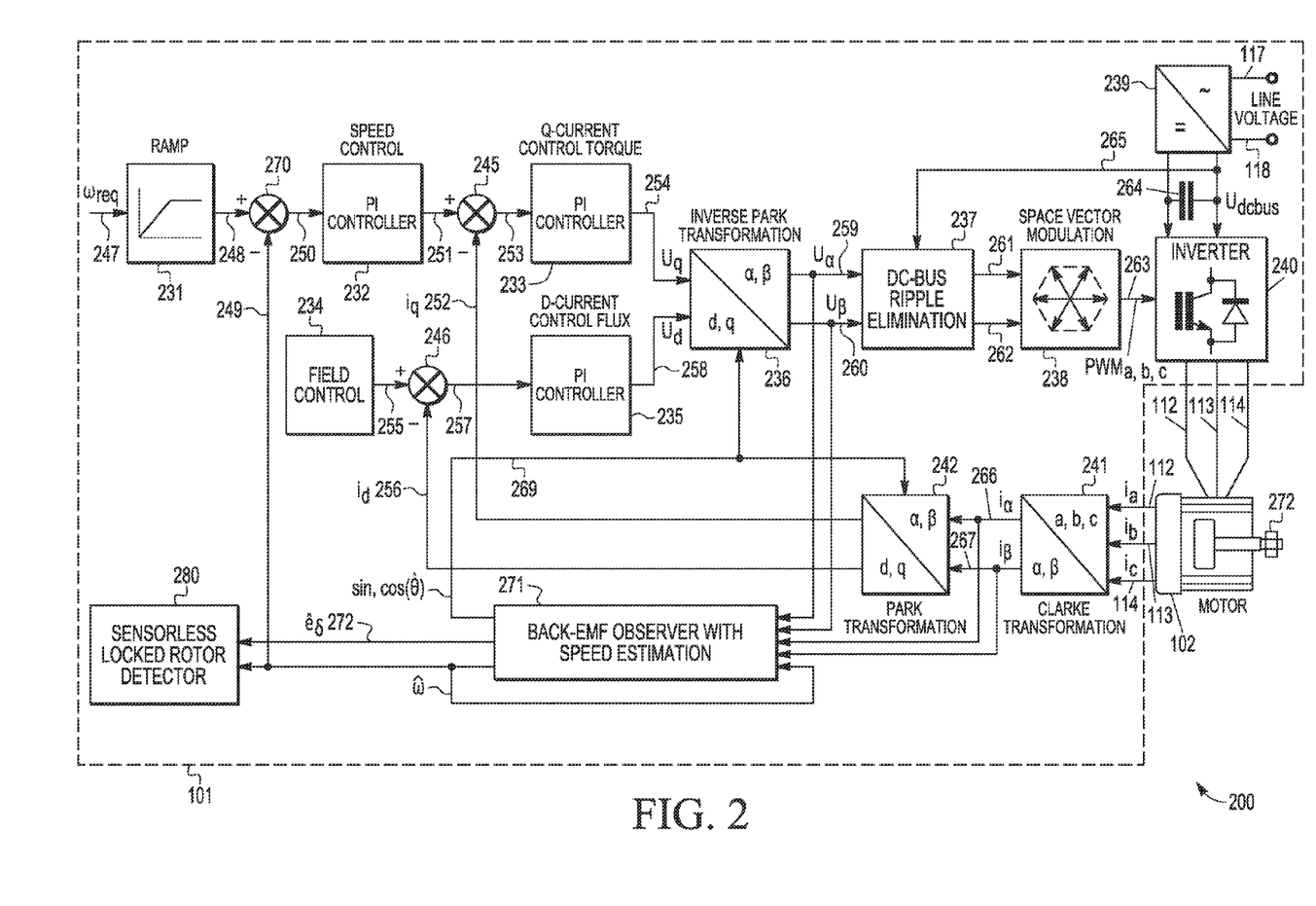
FIG. 2 is a block diagram illustration of an electric motor system comprising control system elements for providing sensorless rotor lock detection based on BEMF observation with speed estimation in accordance with selected embodiments of the present disclosure.

Referring now to FIG. 2, there is shown a block diagram of an electric motor system 200 having control system elements 101 for providing sensorless rotor lock detection based on BEMF observation with speed estimation in accordance with selected embodiments of the present disclosure. As depicted, the electric motor system 200 includes motor control circuit 101 and motor 102. Motor control circuit 101 includes ramp block 231, speed control block 232, quadrature-current (Q-current) control torque block 233, field control block 234, direct-current (D-current) control flux block 235, inverse Park transformation block 236, direct-current (DC) bus ripple elimination block 237, space vector modulation block 238, alternating-current-to-direct-current (AC-to-DC) power conversion block 239, inverter block 240, Clarke transformation block 241, Park transformation block 242, and BEMF tracking observer block 271 for estimating position and speed.

In operation, the ramp block 231 receives a requested angular velocity signal $\omega_{req}$ at input 247 and provides output 248 to adjustment block 270. Adjustment block 270 receives an estimated angular velocity signal $\hat{\omega}$ at output 249 of tracking observer block 271. Adjustment block 270 subtracts $\hat{\omega}$ from $\omega_{req}$ to provide an angular velocity control signal to speed control block 232 at output 250. Speed control block 232 may be implemented, for example, using a proportional integral (PI) controller. Speed control block 232 provides an output signal to adjustment block 245 at output 251. Adjustment block 245 receives a signal from Park transformation block 242 at output 252. Adjustment block 245 subtracts the signal at output 252 from the signal at output 251 to provide a signal at output 253 to Q-current control torque block 233. Q-current control torque block 233 may be implemented, for example, using a PI controller. Q-current control torque block 233 provides a signal $u_q$ at output 254 to inverse Park transformation block 236. In this case, the signal $u_q$ represents the q coordinate component for the rotor related orthogonal coordinate reference frame system (d,q).

Field control block 234 provides a field control signal to adjustment block 246 at output 255. Adjustment block 246 receives a motor current vector signal $i_d$ from Park transformation block 242 at output 256, where $i_d$ as the d coordinate component that is collinear to the rotor flux d coordinate. Adjustment block 246 subtracts the $i_d$ signal at output 256 from the field control signal at output 255 and provides a signal at output 257 to D-current control flux block 235. D-current control flux block 235 may be implemented, for example, using PI controller. D-current control flux block 235 provides a signal $u_d$ at output 258 to inverse Park transformation block 236. In this case, the signal $u_d$ represents the d coordinate component for the rotor related orthogonal coordinate reference frame system (d,q).

Inverse Park transformation block 236 provides a signal $u_\alpha$ at output 259 to DC bus ripple elimination block 237 and to the BEMF observer block 271, and also provides a signal Up at output 260 to DC bus ripple elimination block 237 and to the BEMF observer block 271. In this case, the signals $u_\alpha$, $u_\beta$ represent orthogonal coordinate components for the stator related orthogonal coordinate reference frame system ($\alpha$, $\beta$). DC bus ripple elimination block 237 receives a signal $U_{dcbus}$ from output 265 of AC-to-DC power conversion block 239. DC bus ripple elimination block 237 provides compensation for ripple on the signal $U_{dcbus}$ and provides signals at outputs 261 and 262 to space vector modulation block 238. Space vector modulation block 238 provides pulse width modulation (PWM) motor drive signals $PWM_{a, b, c}$ to inverter block 240 at outputs 263. A line conductor 117 provides a line voltage to AC-to-DC power conversion block 239. A neutral conductor 118 provides a neutral voltage to AC-to-DC power conversion block 239. AC-to-DC power conversion block 239 provides DC voltages to inverter block 240 at one or more outputs 265 which are filtered using DC bus capacitor 264 across the outputs. Inverter block 240 provides motor drive signals at conductors 112, 113, and 114 to electric motor 102 according to PWM motor drive signals $PWM_{a, b, c}$.

Conductors 112, 113, and 114 from electric motor 102 provide signals (e.g., $i_a$, $i_b$ and $i_c$) to inputs of Clarke transformation block 241. Clarke transformation block 241 provides signals $i_\alpha$ and $i_\beta$ to Park transformation block 242 and to BEMF observer block 271 at outputs 266 and 267. Park transformation block 242 receives sin, cos($\hat{\theta}$)—the sine and cosine of the estimated the rotor flux angle $\hat{\theta}$ relative to stator phase—at output 269 from BEMF observer block 271. Park transformation block 242 provides a d component motor current vector signal (e.g., $i_d$) at output 256 to adjustment block 246 and a q component motor current vector signal (e.g., $i_q$) at output 252 to adjustment block 245, where the d coordinate component of the motor current vector $i_d$ is collinear to the rotor flux d coordinate, and where the q coordinate component of the motor current vector $i_q$ is orthogonal to the rotor flux d coordinate. BEMF observer block 271 provides estimated angular velocity signal $\hat{\omega}$ to adjustment block 270 and to position and speed observer block 271 at output 249. BEMF observer block 271 also provides sin, cos($\hat{\theta}$) at output 269 to inverse Park transformation block 236 and to Park transformation block 242. In addition, the BEMF observer block 271 provides estimated BEMF signal value $\hat{e}_\delta$ at output 272, though this value may also be used by the BEMF observer block 271 to generate the angle error $\Theta_{error}$.

In accordance with selected embodiments, the motor 102 may be constructed without including position or rotation sensors. Instead, the motor control circuit 101 includes sensorless locked rotor detector 280 which relies on the BEMF observer 271 to generate estimated quantities for the angular velocity signal $\hat{\omega}$ (which specifies the rotor angular speed) and one or more of the BEMF voltage values $\hat{e}_\delta$ and $\hat{e}_\gamma$. Using one or more of these estimated quantities, the sensorless locked rotor detector 280 may executed one or more algorithms to derive a BEMF error threshold value ($BEMF_{ErrorThreshold}$) and a filtered BEMF difference value ($BEMF_{ErrorFilt}$) for processing with the estimated rotor angular speed value $\hat{\omega}$ to detect locked rotor faults as described more fully hereinbelow.

Figure 3:
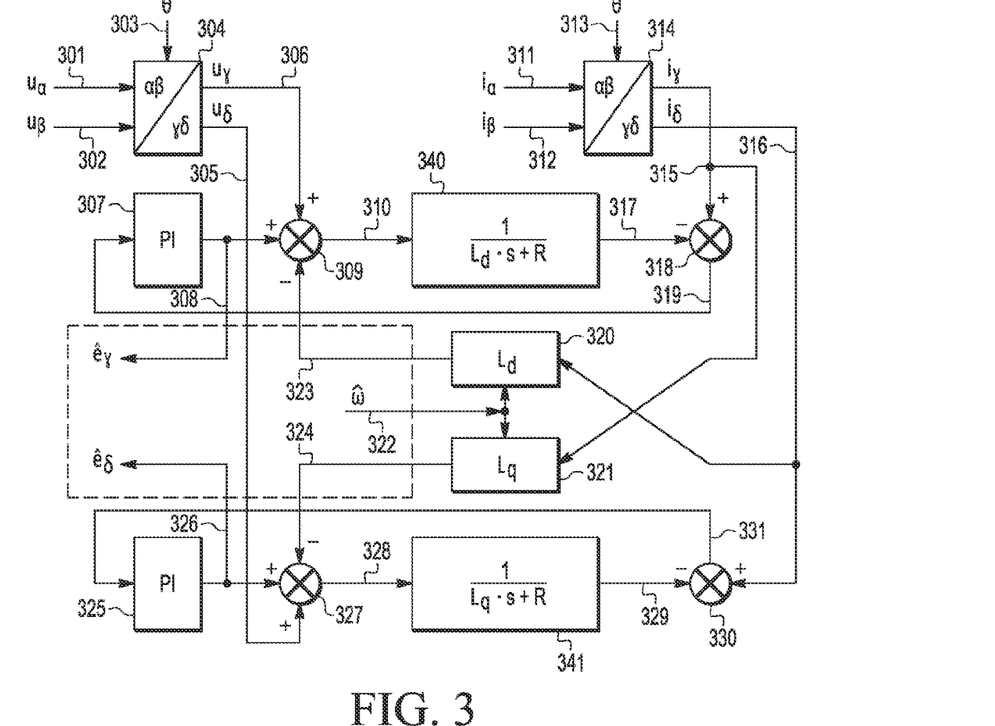
FIG. 3 illustrates a BEMF Luenberger-based observer system for extracting rotor position and speed information in accordance with selected embodiments of the present disclosure.

To provide additional details for an improved understanding of selected embodiments of the present disclosure, reference is now made to FIG. 3 which depicts a Luenberger-based BEMF d,q observer system 300 for extracting estimated rotor position and speed information in accordance with selected embodiments of the present disclosure. The BEMF observer system 300 includes a motor supply voltage vector transformation block 304, motor current vector transformation block 314, first and second proportional integral (PI) controller blocks 307, 325, motor parameter model blocks 340, 341, and d and q axis inductance parameter blocks 320, 321 which are connected to run in virtual rotating frame $\gamma$, $\delta$ shifted to the stator frame $\alpha,\beta$ by the estimated angle $\hat{\theta}$ to generate estimated BEMF signal values $\hat{e}_\delta$ and $\hat{e}_\gamma$. Supply voltage transformation block 304 receives $u_\alpha$, $u_\beta$ components of the stator voltage vector at inputs 301, 302 along with the estimated angle $\hat{\theta}$ to perform a Park transformation. In this case, the signals $u_\alpha$, $u_\beta$ represent orthogonal coordinate components for the stator related orthogonal coordinate reference frame system ($\alpha,\beta$). Under control of the estimated angle $\hat{\theta}$, the supply transformation block 304 generates transformed supply voltages $u_\gamma$, $u_\delta$ at outputs 305, 306 for the estimated rotor voltage vector in the virtual rotating frame $\gamma\delta$ which is shifted from the $\alpha,\beta$ frame by the estimated angle $\hat{\theta}$. In this case, the signals $u_\gamma$, $u_\delta$ represent orthogonal coordinate components for the estimated rotor related orthogonal coordinate reference frame system ($\gamma$, $\delta$). In similar fashion, the current transformation block 314 receives $i_\alpha$, $i_\beta$ components of the stator current vector at inputs 311, 312 along with the estimated angle $\hat{\theta}$ to perform a Park transformation, thereby generating transformed currents $i_\gamma$, $i_\delta$ at outputs 315, 316 for the estimated rotor current vector in the virtual rotating frame $\gamma\delta$ which is shifted from the $\alpha,\beta$ frame by the estimated angle $\hat{\theta}$.

The transformed supply voltages $u_\gamma$, $u_\delta$ at outputs 305, 306 are provided, respectively to adjustment blocks 309, 327. Adjustment block 309 also receives a signal from the PI controller block 307 at signal line 308 which represents the estimated BEMF signal value $\hat{e}_\gamma$. Adjustment block 309 also receives a signal from d-axis inductance parameter block 320 at output 323. Adjustment block 309 subtracts the signal at output 323 from the sum of the signals at lines 306 and 308 to provide a signal at output 310 to the d-axis motor parameter model block 340. At the model block 340, the input signal 310 is applied to the RL motor circuit model ($1/((s \times L_d)+R)$) based on the motor parameters $L_d$ (d-axis inductance), s (Laplace operator), and R (stator resistance), thereby generating an output at signal line 317. In addition to the transformed supply voltage $u_\delta$, the adjustment block 327 receives a signal from the PI controller block 325 at signal line 326 which represents the estimated BEMF signal value $\hat{e}_\delta$. Adjustment block 327 also receives a signal from q-axis inductance parameter block 321 at output 324. Adjustment block 327 subtracts the signal at output 324 from the sum of the signals at lines 305 and 326 to provide a signal at output 328 to the q-axis motor parameter model block 341. At the model block 341, the input signal 328 is applied to the RL motor circuit model ($1/((s \times L_q)+R)$) based on the motor parameters $L_q$ (q-axis inductance), s (Laplace operator), and R (stator resistance), thereby generating an output at signal line 329. In selected embodiments, the observer topology (blocks: 340, 341, 320, 321, 307, 325; signals: 305, 306, 308, 310, 319, 315, 316, 317, 328, 329, 331, 323, 324, 322, 326 and summation points: 309, 318, 327, 330) is based on the Luenberger type of observer utilizing electrical part of mathematical model of the motor (blocks: 340, 341). In this approach, the mathematical model is transformed from the continuous time domain to a discrete time domain by any convenient discretization method. Output signals 308 and 326 are further processed to estimate position 303, 313 and angular speed 322.

The transformed current vector components $i_\gamma$, $i_\delta$ at outputs 315, 316 are provided, respectively, to adjustment blocks 318, 330. At adjustment block 318, the output signal 317 from the motor parameter model block 340 is subtracted from the transformed current vector components $i_\gamma$ at signal line 315 to provide a signal at output 319 to the PI controller block 307. In similar fashion, adjustment block 330 also receives the output signal 329 from the motor parameter model block 341 where it is subtracted from the signal at line 316 to provide a signal at output 331 to the PI controller block 325.

The transformed current vector components $i_\gamma$, $i_\delta$ at outputs 315, 316 are also provided, respectively, as cross-coupled inputs to the q and d axis inductance parameter blocks 321, 320 which also receive the estimated rotor angular speed value $\hat{\omega}$(rad/s) at input line 322. In this configuration, the d and q axis inductance parameter blocks 320, 321 respectively provide output signals 323, 324 to the adjustment blocks 309, 327.

As depicted, the Luenberger-based BEMF observer system 300 uses (stator) voltage and current vectors, estimated position information and the stator inductance and resistance to extract the rotor position estimated error $\hat{\theta}_{error}$ by estimating the BEMF signal values $\hat{e}_\delta$ and $\hat{e}_\gamma$. This is achieved by feeding the current observer with the sum of the actual applied motor voltage, cross-coupled rotational term (which corresponds to the motor saliency) and compensator corrective output. The observer provides estimated BEMF signal values $\hat{e}_\delta$ and $\hat{e}_\gamma$ as disturbance because back-EMF is not included in observer model. As will be appreciated, the accuracy of the estimated BEMF signal values $\hat{e}_\delta$ and $\hat{e}_\gamma$ depends on the correctness of the motor parameters (R, $L_d$, $L_q$), the fidelity of the reference stator voltage, and the quality of compensator, such as bandwidth, phase lag and so on.

Figure 4:
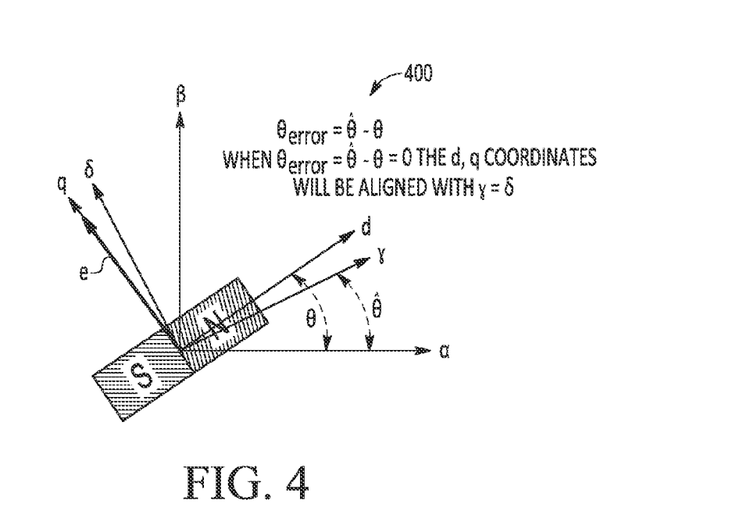
FIG. 4 illustrates rotor related coordinates of a space vector diagram for a permanent magnet synchronous motor.

To provide additional details for an improved understanding of selected embodiments of the present disclosure, reference is now made to FIG. 4 which depicts rotor related coordinates of a space vector diagram 400 for a permanent magnet synchronous motor. The α-β and d-q frames represent the stationary (or stator) and the rotor reference frames, respectively. The α axis corresponds to the magnetic axis of the u phase and the d axis is aligned with the direction of the N pole of the rotor. The γ-δ frame is an estimated frame used in sensorless vector control using the rotor reference frame with the angle error $\Theta_{error}$ representing the difference between the estimated rotor position $\hat{\theta}$ and the actual rotor position θ. When the γ-δ reference frames are aligned with the d-q frames (representing the rotor reference frames), the estimation error $\Theta_{error}=0$ so that the estimated BEMF signal value $\hat{e}_\delta=e$.

Figure 5:
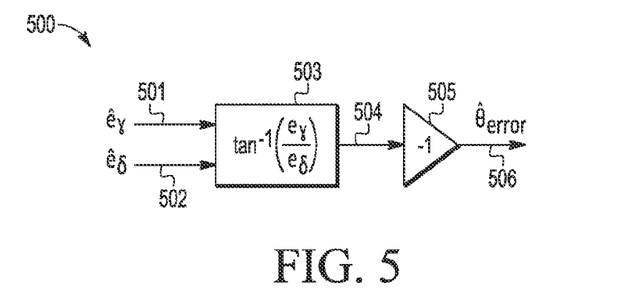
FIG. 5 illustrates a simplified block diagram of an extraction block for generating an angle error from estimated BEMF signal values in accordance with selected embodiments of the present invention.

Using the estimated BEMF signal values $\hat{e}_\delta$ and $\hat{e}_\gamma$ generated by the BEMF observer system 300, any desired extraction process may be used to attain estimates of the electrical rotor position signal $\hat{\theta}$ and its rotor speed $\hat{\omega}$. These known approaches may include using the estimated BEMF signal values $\hat{e}_\delta$ and $\hat{e}_\gamma$ as inputs to an inverse tangent extraction block which calculates the rotor position estimated error $\hat{\theta}_{error}$ between real and virtual rotating reference frame for further processing to extract the estimated electrical rotor position signal $\hat{\theta}$ and estimated rotor speed $\hat{\omega}$. Referring now to FIG. 5, there is shown a simplified block diagram of an extraction block 500 for generating the rotor position estimated error $\hat{\theta}_{error}$ from estimated BEMF signal values $\hat{e}_\delta$ and $\hat{e}_\gamma$ in accordance with selected embodiments of the present invention. The extraction block 500 includes an inverse tangent trigonometric function block 503 which receives the estimated BEMF signal values $\hat{e}_\delta$ and $\hat{e}_\gamma$ on inputs 501, 502. It will be observed that, by dividing the second estimated BEMF voltage value $\hat{e}_\gamma$ by the first estimated BEMF voltage value $\hat{e}_\delta$ and taking the inverse tangent of the resulting quotient, the resulting output at signal line 504 may be inverted at inverter circuit 505 to obtain the rotor position estimated error $\hat{\theta}_{error}$.

Figure 6:
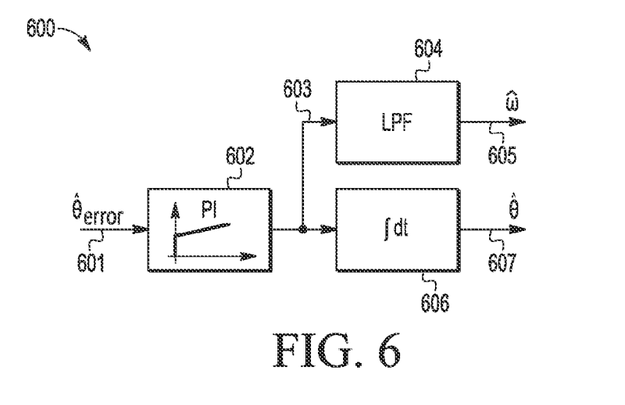
FIG. 6 illustrates a simplified block diagram of an angle tracking observer for generating an estimated rotational angle and speed measures from a computed angle error in accordance with selected embodiments of the present invention.

Since the extraction block 500 shown in FIG. 5 yields values of the unfiltered rotor angle without any speed information, additional processing of the rotor position estimated error $\hat{\theta}_{error}$ is used to generate an estimate of the rotor position $\hat{\theta}$ and rotor speed $\hat{\omega}$. For example, FIG. 6 illustrates a simplified block diagram of an angle tracking observer 600 for generating an estimated rotational angle and speed measures from a computed angle error estimation in accordance with selected embodiments of the present invention. The angle tracking observer 600 includes a controller block 602 which receives the rotor position estimated error $\hat{\theta}_{error}$ at signal input 601. The controller block 602 may be implemented, for example, using PI controller, to generate an unfiltered rotor speed at signal output 603. By applying the unfiltered rotor speed output 603 to the low pass filter 604, some smoothing capability is added in order to extract the estimated rotor speed $\hat{\omega}$ at filter output 605. The angle tracking observer 600 also includes an integral block 606 which receives the unfiltered rotor speed at signal output 603 and generates therefrom the estimated rotor positioned $\hat{\theta}$.

As will be appreciated from the foregoing, the BEMF observer system 300 (shown in FIG. 3) implements a d,q system observer that is controlled by the estimated rotor position signal $\hat{\theta}$ at transformation blocks 304, 314. However, the functional principle of a d,q system observer may use the rotor position estimated error $\hat{\theta}_{error}=\hat{\theta}_r-\theta_r$ to control the transformation blocks 304, 314 to transform, respectively, the rotor voltage vectors $u_d$, $u_q$ (provided at inputs 301, 302) and current vectors $i_d$, $i_q$ (provided at inputs 311, 312) into the virtual rotating frame γ, δ. As described herein, this may be accomplished at the depicted the BEMF observer 271 shown in FIG. 2 by combining the Luenberger-based BEMF d,q observer system 300 (shown in FIG. 3), the Luenberger-based BEMF d,q observer system 300, the extraction block 500 (shown in FIG. 5), and the angle tracking observer 600 (shown in FIG. 6). In such an embodiment, As depicted, the BEMF observer with speed estimation system 271 (or blocks 300, 500 and 600) uses voltage and current vectors information and the stator inductance and resistance to extract the rotor position and velocity information by estimating the BEMF signal values $\hat{e}_\delta$ and $\hat{e}_\gamma$. This is achieved by feeding the current observer with the sum of the actual applied motor voltage, cross-coupled rotational term (which corresponds to the motor saliency) and compensator corrective output. The observer provides estimated BEMF signal values $\hat{e}_\delta$ and $\hat{e}_\gamma$ as disturbance because back-EMF is not included in observer model. The values $\hat{e}_\delta$ and $\hat{e}_\gamma$ are then processed in systems 500 and 600 to estimate the rotor position $\hat{\theta}$ and rotor speed $\hat{\omega}$. As will be appreciated, the accuracy of the estimated BEMF signal values $\hat{e}_\delta$ and $\hat{e}_\gamma$ depends on the correctness of the motor parameters (R, $L_d$, $L_q$), the fidelity of the reference stator voltage, and the quality of compensator, such as bandwidth, phase lag and so on. From the FIGS. 2 and 3, it will be appreciated that the back-EMF observer 300 can be simplified by removing the voltage vector transformation block and replacing the current transformation block 314 with the block 242. At that case, the blocks 304 and 314 are not implemented and Back-EMF observer utilizes voltage signals 258 connected to $u_\gamma$ signal 306, signal 254 connected to the $u_\delta$ 305 and current signals 256 connected to the signal $i_\gamma$ 315 and signal 252 connected to the signal $i_\delta$. It is because the so-called d and q coordinates of the sensorless system are de facto estimated system $\gamma$, $\delta$ coordinates. Such a simplified implementation is one of the alternatives used in the present disclosure, but since such a system is less general, the present disclosure describes the more sophisticated system.

As indicated above, the estimated BEMF signal values $\hat{e}_\delta$ and $\hat{e}_\gamma$ and rotor angular speed value $\hat{\omega}$ may be used to compute fault detection parameters—including a BEMF error threshold value ($BEMF_{ErrorThreshold}$) and a filtered BEMF difference value ($BEMF_{ErrorFilt}$)—for processing with the estimated rotor angular speed value $\hat{\omega}$ to detect locked rotor conditions at a fault handler. To derive the fault detection parameters, it is first noted that the first estimated BEMF voltage value $\hat{e}_\delta$, which is generated as the $\gamma$ coordinate component output of the BEMF observer (e.g., BEMF observer 271), is proportional to the rotor angular speed $\omega$, such that $\hat{e}_\delta \approx c \cdot \omega$, where c is a coefficient. In addition, it is understood that the amplitude of estimated BEMF voltage value $\hat{e}_\delta$ converges to real motor back-EMF voltage $e_q$, orthogonal to rotor flux d coordinate, such that $e_q \approx \hat{e}_\delta$. Finally, it is understood that the back-EMF voltage $e_q$ is approximately dependent on the rotor angular speed $\omega$ and motor constant $K_e$ (e.g., $e_q = K_e \cdot \omega$). With this understanding, the voltage amplitude of the BEMF signal $\hat{e}_q$ can therefore be estimated from the estimated speed $\hat{\omega}$, such that $\hat{e}_q = c_{BemfCoef} \cdot \hat{\omega} + c_{BemfOffset} \cdot sgn(\hat{\omega})$, where the coefficient terms $c_{BemfCoef}$ and $c_{BemfOffset}$ are defined by measurement on the real motor to provide, respectively, a BEMF coefficient ($c_{BemfCoef}$) and a BEMF offset coefficient ($c_{BemfOffset}$). In this equation, the second term ($c_{BemfOffset} \cdot sgn(\omega)$) is included to account for some offset caused by the inverter and other system offsets. In addition, it will be understood that the $sgn(\hat{\omega})$ term represents the sign function so that the function output is +1 if $\hat{\omega} > 0$, and is −1 if $\hat{\omega} < 0$.

Using the computed voltage amplitude of the BEMF signal $\hat{e}_q$, a first fault detection parameter may be computed as a filtered BEMF difference value ($BEMF_{ErrorFilt}$) with respect to the estimated BEMF signal value $\hat{e}_\delta$ (generated by the BEMF observer) $\hat{e}_q$ using a variety of calculations. For example, a first option is to calculate the first fault detection parameter as a filtered absolute difference, $BEMF_{ErrorFilt} = Filter(abs(\hat{e}_\delta - \hat{e}_q))$, where the simplest filter can be implemented as a first order filter having the transfer function:

$$Filter(s) = \frac{1}{T_f s + 1}$$

where $T_f$ is a filter time constant defined by application specific dynamic behavior. As will be appreciated, more sophisticated filtering can be used.

As will be appreciated, other options exist for calculating the filtered BEMF difference value. For example, a second option is to calculate the first fault detection parameter as a filtered difference, $BEMF_{ErrorFilt} = Filter(\hat{e}_\delta - \hat{e}_q)$ (e.g., without computing the absolute value of the difference ($\hat{e}_\delta - \hat{e}_q$). In addition, a third option is to calculate the first fault detection parameter as a filtered and squared difference, $BEMFP2_{ErrorFilt} = Filter((\hat{e}_\delta - \hat{e}_q)^2)$. A fourth option is to calculate the first fault detection parameter as a filtered product of the absolute difference that is normalized by multiplying by a nonlinear scaling function (SCF), $BEMF_{ErrorFilt} = Filter(abs(\hat{e}_\delta - \hat{e}_q) \cdot SCF)$. A fifth option is to calculate the first fault detection parameter as a filtered square of the product of the difference multiplied by the nonlinear scaling function (SCF), $BEMF_{ErrorFilt} = Filter((\hat{e}_\delta - \hat{e}_q) \cdot SCF)^2)$. For example, the filtered BEMF difference value can be calculated using a modification of the error value. One of the possible implementation of the nonlinear scaling function could be as follows:

$$SCF = \begin{cases} \dfrac{1}{\omega_{Min}}, & \text{when } abs(\hat{\omega}) < \omega_{Min} \\ \dfrac{1}{abs(\hat{\omega})}, & \text{when } abs(\hat{\omega}) \geq \omega_{Min} \end{cases}$$

Where the $\omega_{Min}$ is angular speed limit which can be constant, or variable. The filtered error is then $BEMF_{ErrorFilt} = Filter(abs(\hat{e}_\delta - \hat{e}_q) \cdot SCF)$ or $BEMF_{ErrorFilt} = Filter(((\hat{e}_\delta - \hat{e}_q) \cdot SCF)^2)$ respectively. However calculated, the filtered BEMF difference value, $BEMF_{ErrorFilt}$, provides a filtered back-EMF error measure between the estimated BEMF signal values $\hat{e}_\delta$ from the BEMF observer and the $\hat{e}_q$ term calculated from the estimated speed and motor constant.

When deriving the filtered BEMF difference value ($BEMF_{ErrorFilt}$), it will be appreciated that there will be imprecision in the computation of the estimated BEMF signal $\hat{e}_q = c_{BemfCoef} \cdot \hat{\omega} + c_{BemfOffset} \cdot sgn(\hat{\omega})$, due to coefficient errors, observer model error, motor parameters variation, observer dynamic error etc., that effect the accuracy of the coefficient terms, $c_{BemfCoef}$, $c_{BemfOffset}$. To account for such errors and variations, a second fault detection parameter, BEMF error threshold value ($BEMF_{ErrorThreshold}$), may be computed as a BEMF error threshold value that is dependent on the estimated rotor angular frequency value $\hat{\omega}$. For example, the BEMF error threshold value ($BEMF_{ErrorThreshold}$) may be computed as the product of a BEMF error threshold coefficient ($C_{BEMFThresholdCoef}$) and the absolute value of the estimated rotor angular speed value $\hat{\omega}$, subject to a first minimum threshold BEMF value ($C_{BEMFThresholdMin}$), such that $$BEMF_{ErrorThreshold}(\hat{\omega}) = \begin{cases} c_{BemfThresholdMin}, \\ \text{when: } c_{BemfThresholdCoef} \cdot \text{abs}(\hat{\omega}) < c_{BemfThresholdMin} \\ c_{BemfThresholdCoef} \cdot \text{abs}(\hat{\omega}), \\ \text{when: } c_{BemfThresholdCoef} \cdot \text{abs}(\hat{\omega}) \geq c_{BemfThresholdMin} \end{cases}$$

Figure 7:
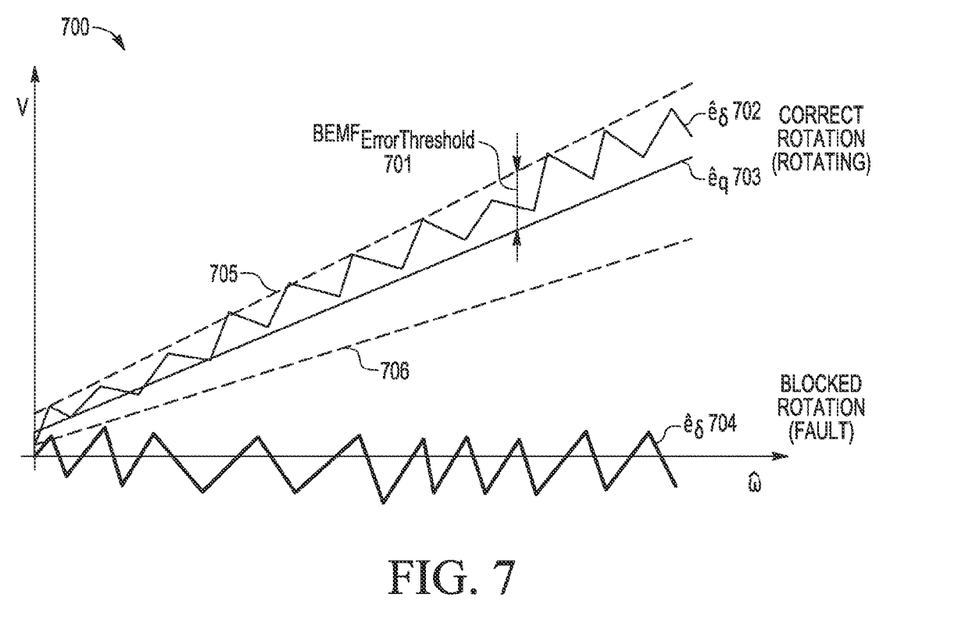
FIG. 7 graphically illustrates the BEMF error detection threshold and estimated back-EMF voltages as a function of the estimated rotor angular frequency in accordance with selected embodiments of the present invention.

For this computation of the BEMF error threshold value (BEMFErrorThreshold($\hat{\omega}$)), the coefficients $C_{BemfThresholdMin}$, $C_{BemfThresholdCoef}$ can be set experimentally by taking measurements on the real motor. And when computed as a function of the estimated rotor angular speed value $\hat{\omega}$, the size of the BEMF error threshold value increases in relation to the estimated rotor angular speed value $\hat{\omega}$, thereby allowing for imprecisions in the estimated BEMF signal $\hat{e}_q$. To illustrate this relationship, reference is now made to FIG. 7 which graphically depicts the BEMF error detection threshold signal 701, the correct estimated δ-component output $\hat{e}_δ$ signal 702 (representing rotor rotation during correct motor operation), the estimated BEMF signal $\hat{e}_q$ 703, and the estimated $\hat{e}_δ$ fault signal 704 (representing rotor rotation during blocked or locked rotor condition). As depicted, the BEMF error detection threshold 701 is computed as a function of the estimated rotor angular frequency $\hat{\omega}$ to increase in size up from a minimum BEMF error threshold value (e.g., $c_{BemfThresholdMin}$), and is illustrated with the dashed border lines 705, 706 to show the value of the $BEMF_{ErrorThreshold}$ since the abs($BEMF_{ErrorFilt}$) is absolute value. Positioned in relation to the real motor back-EMF voltage $e_q$, the BEMF error threshold value ($BEMF_{ErrorThreshold}(\hat{\omega})$) may be used to detect a locked rotor fault. Optionally, the $BEMF_{ErrorThreshold}$ can be simplified as a speed independent function, so the $c_{BemfThresholdCoef}$=0 or the $BEMF_{ErrorThreshold}(\hat{\omega})$=$c_{BemfThresholdMin}$.

In a first example embodiment for detecting a locked rotor fault, a fault is indicated if the absolute value of the filtered absolute difference $BEMF_{ErrorFilt}$ exceeds the BEMF error threshold value (BEMFErrorThreshold($\hat{\omega}$)) or if the absolute value of the estimated rotor angular speed value $\hat{\omega}$ falls below a minimum stall speed (e.g., abs($\hat{\omega}$)<$\omega_{StallMin}$) Stated another way, a fault is detected:

if (abs($BEMF_{ErrorFilt}$)>$BEMF_{ErrorThreshold}$)

OR (abs($\hat{\omega}$)<$\omega_{StallMin}$).

In a second example embodiment for detecting a locked rotor fault, a fault is indicated if the absolute value of the filtered difference ($BEMF_{ErrorFilt}$=Filter($\hat{e}_δ$−$\hat{e}_q$)) exceeds the BEMF error threshold value (BEMFErrorThreshold($\hat{\omega}$)) or if the absolute value of the estimated rotor angular speed value $\hat{\omega}$ falls below a minimum stall speed (e.g., abs($\hat{\omega}$) <$\omega_{StallMin}$) Stated another way, a fault is detected:

if (abs($BEMF_{ErrorFilt}$=Filter($\hat{e}_δ$−$\hat{e}_q$))> $BEMF_{ErrorThreshold}$)

OR (abs($\hat{\omega}$)<$\omega_{StallMin}$).

In a third example embodiment for detecting a locked rotor fault, a fault is indicated if the absolute value of the filtered and squared difference ($BEMF_{ErrorFilt}$=Filter(($\hat{e}_δ$− $\hat{e}_q$)$^2$)) exceeds the squared BEMF error threshold value (BEMFErrorThreshold($\hat{\omega}$)$^2$) or if the absolute value of the estimated rotor angular speed value $\hat{\omega}$ falls below a minimum stall speed (e.g., abs($\hat{\omega}$)<($\omega_{StallMin}$). Stated another way, a fault is detected:

if ($BEMF_{ErrorFilt}$>$BEMF_{ErrorThreshold}^2$)

OR (abs($\hat{\omega}$)<$\omega_{StallMin}$).

Figure 8:
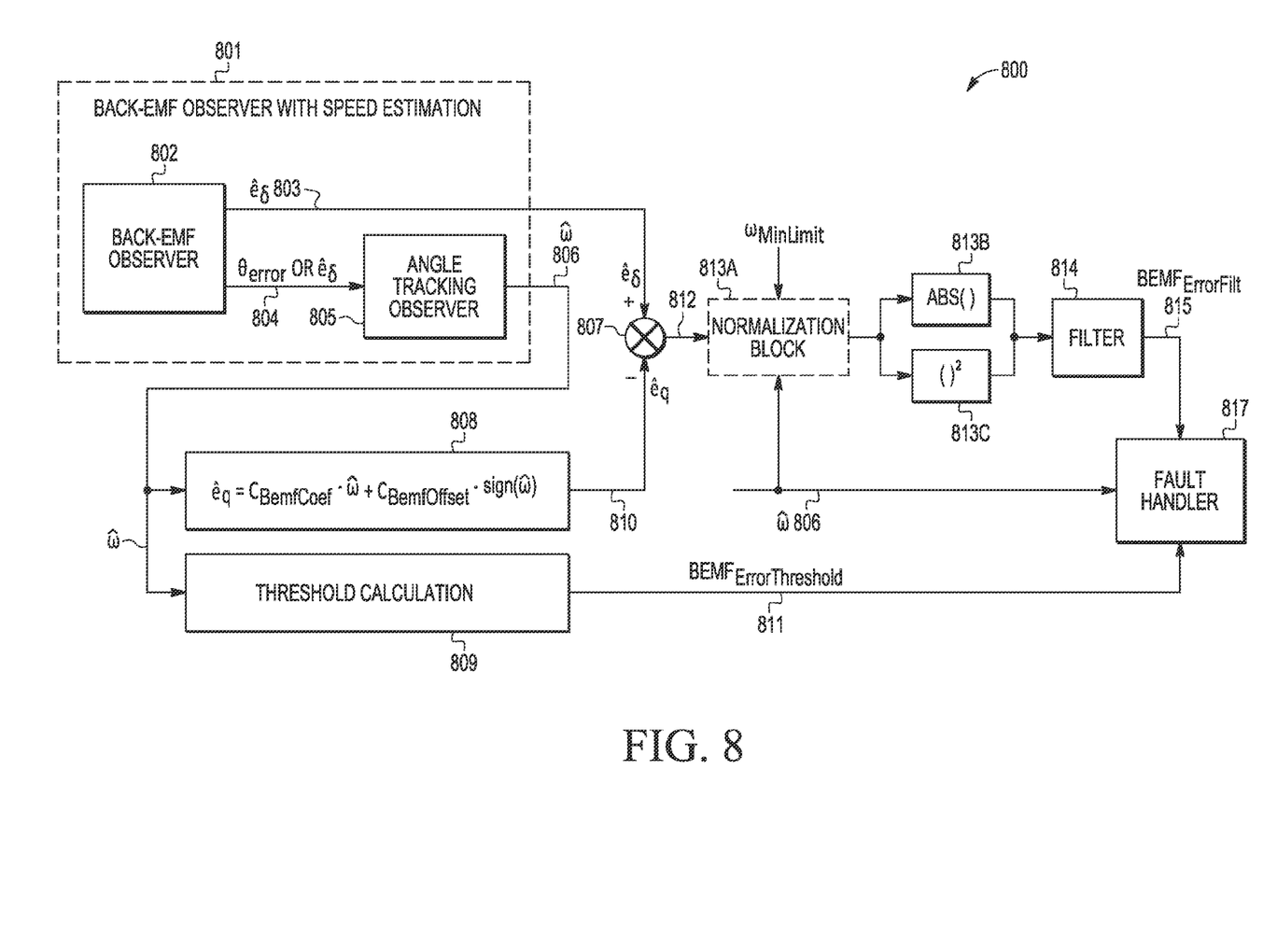
FIG. 8 illustrates a simplified block diagram of a locked rotor detector in accordance with selected embodiments of the present invention.

To provide additional details for an improved understanding of selected embodiments of the present disclosure, reference is now made to FIG. 8 which depicts a simplified block diagram of a locked rotor detector 800 in accordance with selected embodiments of the present disclosure. The locked rotor detector 800 includes back-EMF observer block 801 for generating an estimated rotor angular speed value $\hat{\omega}$ and a first estimated BEMF voltage value $\hat{e}_δ$, a first calculation block 808 for computing a second estimated BEMF voltage signal $\hat{e}_q$, a second calculation block 809 for computing a BEMF error threshold value, a filter block 814 for applying a filter to a BEMF difference value, and a fault handler block 817 for detecting a locked rotor condition.

The back-EMF observer block 801 may be implemented with a back electromotive force observer 802 which generates a first estimated BEMF voltage value $\hat{e}_δ$ as the δ coordinate component at signal line 803 or signal line 804. Alternatively, the back electromotive force observer 802 may generate an estimation error $\ominus_{error}$ between real and virtual rotating reference frame at signal line 804. The back-EMF observer block 801 may also be implemented with an angle tracking observer 805 which receives either the first estimated BEMF voltage value $\hat{e}_δ$ or the estimation error $\ominus_{error}$ received on the signal line 804, and generates therefrom an estimate of the rotor angular speed $\hat{\omega}$ at signal line output 806. In selected embodiments, the angle tracking observer 805 determines the angular speed and position of input functional signal 804. The estimated rotor angular speed $\hat{\omega}$ 806 is provided to the first calculation block 808 and second calculation block 809.

At the first calculation block 808, a second estimated BEMF voltage signal $\hat{e}_q$ is calculated from the motor constant and estimated speed to generate the second estimated BEMF signal $\hat{e}_q$ at output 810. For example, the second estimated BEMF signal $\hat{e}_q$ can computed as a function of the estimated speed $\hat{\omega}$, such that $\hat{e}_q$=$c_{BemfCoef}$·$\hat{\omega}$+$c_{BemfOffset}$·sgn ($\hat{\omega}$), where BEMF coefficient ($c_{BemfCoef}$) and BEMF offset coefficient ($c_{BemfOffset}$) are defined by measurement on the real motor to provide.

At the second calculation block 809, the BEMF error threshold value is calculated from the estimated speed and defined physical limits to generate the BEMF error threshold value ($BEMF_{ErrorThreshold}$) at output 811. For example, using the BEMF error threshold coefficient ($C_{BEMFThresholdCoef}$) to represent experimentally-set physical limits of the motor, the BEMF error threshold value $BEMF_{ErrorThreshold}$ can computed as a product of a BEMF error threshold coefficient ($C_{BEMFThresholdCoef}$) and the absolute value of the estimated rotor angular speed value $\hat{\omega}$, subject to a first minimum threshold BEMF value ($C_{BEMFThresholdMin}$) if the computed product goes below the first minimum threshold BEMF value.

At adjustment block 807, the second estimated BEMF signal $\hat{e}_q$ is subtracted from the first estimated BEMF voltage value $\hat{e}_\delta$ to yield a difference value at signal output 812. The difference value is applied directly or indirectly to the filter block 814. For example, the difference value may be processed by a normalization block 813A, in which the signal 812 amplitude is multiplied by the nonlinear scaling function SCF. The SCF can be calculated from the input speed absolute value abs($\hat{\omega}$) of signal 806, and angular speed limit $\omega_{MinLimit}$. In addition or in the alternative, the difference value 812 may be processed by a magnitude functional block 813B which computes the absolute value from the difference value provided at line 812 (or from block 813A). Alternatively, the difference value may be processed by a squaring functional block 813C which computes the square of the difference value provided at line 812 (or from block 813A). Whichever processing is applied, the filter 814 processes the results to provide a filtered back-EMF error measure (BEMF$_{ErrorFilt}$) at signal output line 815 which represents the error between the estimated BEMF voltage value $\hat{e}_\delta$ (from the BEMF observer 801) and the second estimated BEMF voltage value $\hat{e}_q$ (calculated at calculation block 808 from the estimated speed and motor constant).

At the fault handler block 817, the estimated speed $\hat{\omega}$ is received at signal input line 806, along with the filtered back-EMF error measure (BEMF$_{ErrorFilt}$) 815 and the BEMF error threshold value (BEMF$_{ErrorThreshold}$) 811. These signal inputs may be processed at the fault handler block 817 as a interrupt service routine to detect a locked or stalled rotor condition if the absolute value of the filtered back-EMF error measure is greater than the BEMF error threshold value (e.g., abs(BEMF$_{ErrorFilt}$)> BEMF$_{ErrorThreshold}$) or if the absolute value of the estimated speed $\omega$ is less than a minimum stall speed (e.g., abs($\hat{\omega}$)<$\omega_{StallMin}$).

Figure 9:
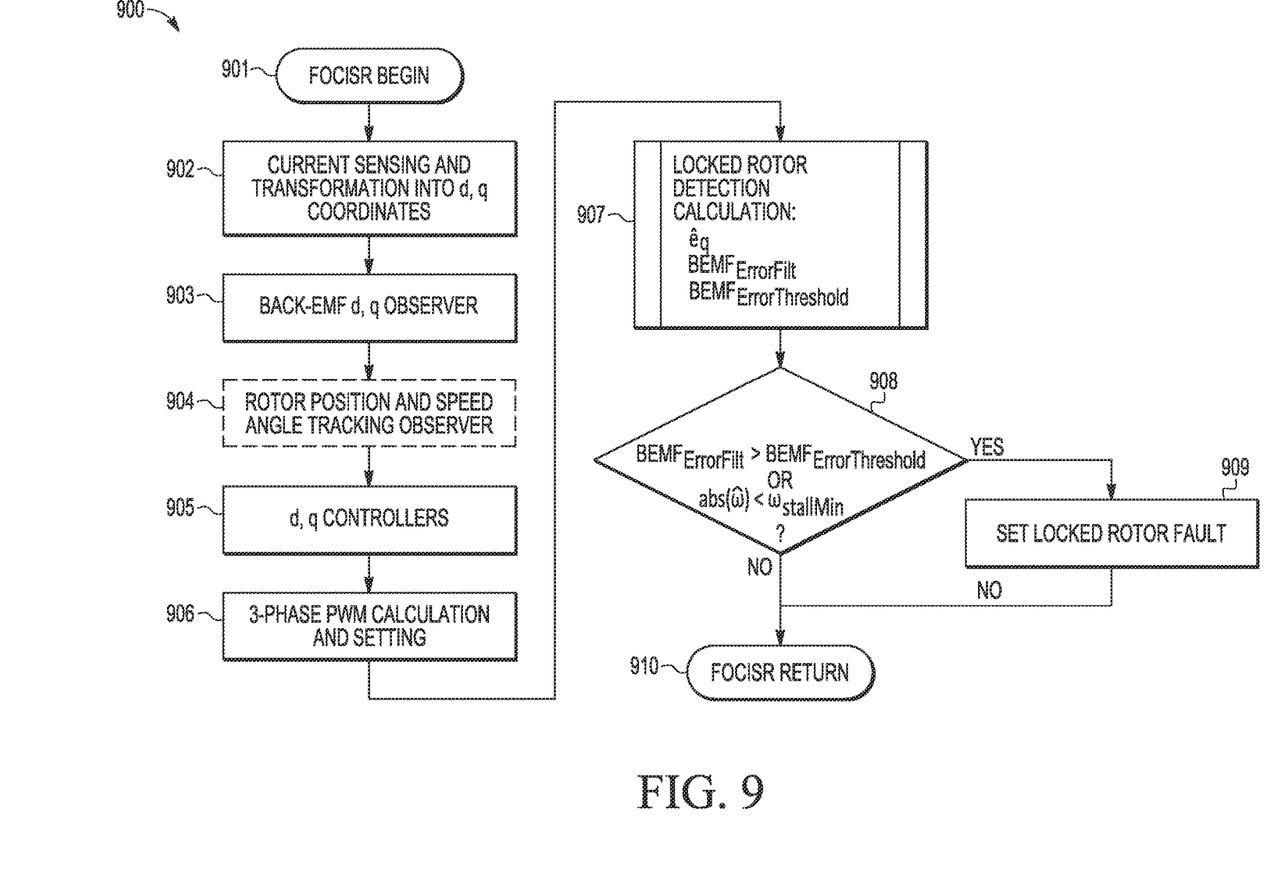
FIG. 9 illustrates a simplified flowchart of a method for controlling a permanent magnet synchronous motor with a sensorless field-oriented control interrupt service routine to detect a locked rotor fault condition in accordance with selected embodiments of the present invention.

Turning now to FIG. 9, there is illustrated a simplified flow chart sequence 900 of a method for controlling a permanent magnet synchronous motor with a sensorless field-oriented control interrupt service routine to detect a locked rotor fault condition in accordance with selected embodiments of the present invention. At step 901, the method starts when the field-oriented control interrupt service routine is invoked on a predetermined basis to periodically or otherwise check for a locked rotor condition.

At step 902, the motor current measurements are sensed or otherwise obtained and transformed into the d,q coordinate system. In selected embodiments, one or more measured motor current measurements $i_a$, $i_b$ and $i_c$ are transformed into signals $i_\alpha$ and $i_\beta$ in the stator-related orthogonal coordinate reference frame system ($\alpha$, $\beta$) using a Clarke transformation process, and then the signals $i_\alpha$ and $i_\beta$ are transformed into signals $i_d$ and $i_q$ in the rotor-related orthogonal coordinate reference frame system (d, q) using a Park transformation process.

At step 903, the back-EMF observer processes the received signal information as a d,q system observer to generate rotor position and speed information from the conventionally defined back-EMF values, along with the stator resistance R and the d-axis and q-axis stator inductance values $L_d$, $L_q$. In selected embodiments, the back-EMF observer is implemented as a Luenberger-based BEMF observer which runs in virtual rotating frame ($\gamma$,$\delta$) shifted to the rotating frame dq by estimation error $\Theta_{error}$ to generate estimated back-EMF signals $\hat{e}_\delta$ and $\hat{e}_\gamma$.

At step 904, the back-EMF observer extracts the estimated rotor position $\hat{\theta}$ and rotor speed $\hat{\omega}$. In selected embodiments, the rotor position and speed information uses estimated back-EMF signals $\hat{e}_\delta$ and $\hat{e}_\gamma$ with an angle tracking observer to generate an angle error $\Theta_{error}$ which is processed to generate an unfiltered rotor speed that is filtered or smoothed to extract the estimated rotor speed $\hat{\omega}$. Additional processing of the unfiltered rotor speed (e.g., with integral block) is used to generate the estimated rotor position $\hat{\theta}$.

At step 905, the transformed signals $i_d$ and $i_q$ are supplied to the d and q current controllers, respectively. In selected embodiments, the $i_d$ signal and field control signal are combined and supplied to the D-current controller, while the $i_q$ signal and speed control signal are combined and supplied to the Q-current controller to generate, respectively, the $u_d$ and $u_q$ voltage signals as the d and q coordinate components of the rotor voltage vector.

At step 906, the $u_d$ and $u_q$ voltage signals are used to calculate the 3-phase pulse width modulation (PWM) signals and settings for controlling the electric motor. In selected embodiments, an inverse Park transformation process is used to transform the $u_d$ and $u_q$ voltage signals into voltage signals $u_\alpha$, $u_\beta$ that are processed for application to the electric motor, such as by providing the voltage signals $u_\alpha$, $u_\beta$ to a DC bus ripple elimination block that provides compensated signals to space vector modulation block which provides pulse width modulation (PWM) motor drive signals PWM$_{a, b, c}$ to inverter block which provides motor drive signals to the electric motor.

At step 907, locked rotor fault detection parameters are calculated based on estimated BEMF and speed quantities (e.g., an estimated rotor angular speed value $\hat{\omega}$ and a first estimated BEMF voltage value $\hat{e}_\delta$) generated by the BEMF observer. For example, a second estimated BEMF voltage value $\hat{e}_q$ may be computed from specified motor constant values (e.g., $c_{BemfCoef}$, $c_{BemfOffset}$) and the estimated rotor angular speed value $\hat{\omega}$(e.g., $\hat{e}_q$=$c_{BemfCoef}\cdot\hat{\omega}$+$c_{BemfOffset}\cdot$sgn($\hat{\omega}$)), and then subtracted from the first estimated BEMF voltage value $\hat{e}_\delta$ to generate a filtered BEMF difference value (BEMF$_{ErrorFilt}$). In addition, the BEMF error threshold value (BEMF$_{ErrorThreshold}$) may be computed as the product of a BEMF threshold coefficient (C$_{BEMFThresholdCoef}$) and the absolute value of the estimated rotor angular speed value $\hat{\omega}$, subject to a first minimum threshold BEMF value (C$_{BEMFThresholdMin}$).

At step 908, the estimated rotor speed $\hat{\omega}$ and locked rotor fault detection parameters are processed to detect a fault condition when either of two conditions is met. In selected embodiments, the first condition occurs when the filtered BEMF difference value (BEMF$_{ErrorFilt}$) exceeds the BEMF error threshold value (BEMF$_{ErrorThreshold}$). In other embodiments, the first condition occurs when the filtered BEMF difference value (BEMF$_{ErrorFilt}$) exceeds the square of the BEMF error threshold value (BEMF$_{ErrorThreshold}$). In selected embodiments, the second condition occurs when the absolute value of the estimated rotor angular speed value $\hat{\omega}$ is less than a minimum stall speed (e.g., $\omega_{StallMin}$). If either of the first or second conditions occurs (affirmative outcome to detection step 908), a locked rotor fault flag may be set at step 909. With the locked rotor fault flag set, the application can enter a fault condition operation to stop motor operation and wait, generate an error indication, await expiration of a fault timeout, etc. In addition or in the alternative, the locked rotor fault can be handled as a motor restart where the microcontroller resets the system and peripheral values (including fault state settings), prepares the motor for restart, and then executes motor run operations which include periodic execution of the sensorless field-oriented control interrupt service routine. However, if neither of the first or second conditions occurs (negative outcome to detection step 908), there is no locked rotor fault detected, and the field-oriented control interrupt service routine ends or returns (step 910).

By now it should be appreciated that there is provided herein a method and apparatus for detecting a rotor lock condition in a permanent magnet synchronous motor. In the disclosed methodology and apparatus, a BEMF observer determines an estimated rotor speed $\hat{\omega}$ and a first estimated back electromotive force (BEMF) voltage value in an estimated rotor-related reference frame. For example, the first estimated BEMF voltage value $\hat{e}_\delta$ may be computed as a $\delta$ coordinate in virtual rotating reference frame $(\gamma, \delta)$. Based on at least a first motor constant and the estimated rotor speed $\hat{\omega}$, a second estimated BEMF voltage value is calculated. For example, the second estimated BEMF voltage value $\hat{e}_q = c_{BemfCoef} \cdot \hat{\omega} + c_{BemfOffset} \cdot \text{sgn}(\hat{\omega})$ may be computed as a q coordinate in virtual rotating reference frame (d,q). The difference between the first estimated BEMF voltage value $\hat{e}_\delta$ and the second estimated BEMF value $\hat{e}_q$ is optionally normalized by the SCF function, further processed either by absolute function or square function and filtered by the digital filter to generate filtered BEMF error $BEMF_{ErrorFilt}$. Using the first $\hat{e}_\delta$ and second $\hat{e}_q$ estimated BEMF voltage values, a filtered BEMF error value is generated, such as by filtering an absolute value of a difference between the first $\hat{e}_\delta$ and second $\hat{e}_q$ estimated BEMF voltage values, or by filtering a difference between the first $\hat{e}_\delta$ and second $\hat{e}_q$ estimated BEMF voltage values, or by filtering a squared difference between the first $\hat{e}_\delta$ and second $\hat{e}_q$ estimated BEMF voltage values or by filtering absolute value of a difference between the first $\hat{e}_\delta$ and second $\hat{e}_q$ estimated BEMF voltage values which is normalized by the SCF function or by filtering squared difference between the first $\hat{e}_\delta$ and second $\hat{e}_q$ estimated BEMF voltage values which is normalized by the SCF function before power by two calculation. In addition, a BEMF error threshold value is generated as a function of the estimated rotor speed $\hat{\omega}$ subject to a minimum threshold BEMF value, such as by calculating a product of a BEMF threshold coefficient ($C_{BEMFThresholdCoef}$) and an absolute value of the estimated rotor speed $\omega$, subject to the minimum threshold BEMF value. Finally, at least the BEMF error filter value and the BEMF error threshold value are used to detect if a rotor lock condition exists. In selected embodiments, the rotor lock condition is detected by determining if an absolute value of the BEMF error filter value exceeds the BEMF error threshold value. In other embodiments, the rotor lock condition is detected by determining if an absolute value of the BEMF error filter value exceeds the BEMF error threshold value. In yet other embodiments, the rotor lock condition is detected by squaring the BEMF error threshold value to generate a squared BEMF error threshold value and determining if the BEMF error filter value exceeds the squared BEMF error threshold value. In addition, the step of detecting if the rotor lock condition exists may include detecting if an absolute value of the estimated rotor speed value $\hat{\omega}$ falls below a minimum stall speed ($\omega_{StallMin}$).

In another form, there is provided an electric motor controller and associated method of operation. As disclosed, the controller includes a back electromotive force (BEMF) measurement circuit for determining a first estimated back electromotive force (BEMF) voltage value (e.g., $\hat{e}_\delta$) in an estimated rotor-related reference frame (e.g., virtual rotating reference frame $(\gamma, \delta)$) and for determining an estimated rotor speed $\hat{\omega}$. The controller also includes a processor coupled to the back EMF measurement or estimation circuit to calculate fault detection parameters, including a second estimated back electromotive force (BEMF) voltage value (e.g., $\hat{e}_q$) in a rotor-related reference frame (e.g., rotating reference frame (d,q)) based on at least a first motor constant and the estimated rotor speed $\hat{\omega}$. The processor also calculates a BEMF error filter value based on a difference between the first and second estimated back electromotive force (BEMF) voltage values. For example, the BEMF error filter value may be calculated by filtering an absolute value of a difference between the first and second estimated BEMF voltage values, or by filtering a difference between the first and second estimated BEMF voltage values, or by filtering a squared difference between the first and second estimated BEMF voltage values or by filtering absolute value of a difference between the first and second estimated BEMF voltage values which is normalized by the SCF function or by filtering squared difference between the first and second estimated BEMF voltage values which is normalized by the SCF function before power by two calculation. The processor also calculates a BEMF error threshold value as a function of the estimated rotor speed $\hat{\omega}$ subject to a minimum threshold BEMF value. For example, the BEMF error threshold value may be calculated as a product of a BEMF threshold coefficient ($C_{BEMFThresholdCoef}$) and an absolute value of the estimated rotor speed $\omega$, subject to the minimum threshold BEMF value. The processor is coupled to an electric motor driver circuit for providing drive signals for controlling delivery of power to an electric motor, where the processor is configured to detect if a rotor lock condition exists at the electric motor based on at least the BEMF error filter value and the BEMF error threshold value. In addition, the processor is configured to cause the electric motor driver circuit to discontinue application of power to the electric motor upon detecting a rotor lock condition.

In yet another form, there is provided a system and method of operation for detecting locked rotor in a permanent magnet synchronous motor. The disclosed system includes a device for producing an estimated rotor speed $\hat{\omega}$ and a first estimated BEMF voltage value $\hat{e}_\delta$ as a $\delta$ coordinate in virtual rotating reference frame $(\gamma, \delta)$. The system also includes an estimator block coupled to receive the estimated rotor speed $\hat{\omega}$ from the device for computing a second estimated BEMF voltage value comprises calculating a second estimated BEMF voltage value $\hat{e}_q = c_{BemfCoef} \cdot \hat{\omega} + c_{BemfOffset} \cdot \text{sgn}(\hat{\omega})$ as a q coordinate in rotating reference frame (d,q). In the system, a threshold block is coupled to receive the estimated rotor speed $\hat{\omega}$ from the device for computing a BEMF error threshold signal as a product of a BEMF threshold coefficient ($C_{BEMFThresholdCoef}$) and an absolute value of the estimated rotor speed $\omega$, subject to a minimum threshold BEMF value. In addition, a filtered back-EMF error block is coupled to the device and the estimator block for receiving the first estimated BEMF voltage value $\hat{e}_\delta$ and the second estimated BEMF voltage value $\hat{e}_q$, whereby the filtered back-EMF error block outputs a BEMF error filter signal indicative of a filtered comparison between the first estimated BEMF voltage value $\hat{e}_\delta$ and the second estimated BEMF voltage value $\hat{e}_q$. Finally, the system includes a fault handler coupled to the estimator block and threshold block for detecting a rotor lock condition based on at least the BEMF error filter signal and the BEMF error threshold signal.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and flow charts illustrating design and operational details of a sensorless locked rotor detector method and apparatus without including every device feature or aspect in order to avoid limiting or obscuring the present invention. Such descriptions and representations are used by those skilled in the art to describe and convey the substance of their work to others skilled in the art, and the omitted details which are well known are not considered necessary to teach one skilled in the art of how to make or use the present invention.

Although the described exemplary embodiments disclosed herein are directed to a method and apparatus in which locked rotor faults are detected by comparing a computed BEMF error threshold value to the filtered difference between an estimated back-EMF signals $\hat{e}_\delta$ (from the back-EMF observer) and an estimated BEMF voltage value $\hat{e}_q$ (calculated from motor constant and estimated speed $\hat{\omega}$) in the context of 3-phase PMSM motor operation, the present invention is not necessarily limited to the example embodiments which illustrate inventive aspects of the present invention that are applicable to a wide variety of electric motor systems. Thus, the particular embodiments disclosed above are illustrative only and should not be taken as limitations upon the present invention, as the invention may be modified and practiced in different but equivalent manners apparent to those skilled in the art having the benefit of the teachings herein. For example, the methodology of the present invention may be applied using estimated BEMF signal in other coordinate domains than expressly set forth herein. In addition, the process steps may be performed in an alternative order than what is presented. Furthermore, those skilled in the art will recognize that boundaries between the functionality of the above described operations merely illustrative. The functionality of multiple operations may be combined into a single operation, or the functionality of a single operation may be distributed in additional operations. Moreover, alternative embodiments may include multiple instances of a particular operation, and the order of operations may be altered in various other embodiments. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

As disclosed herein, the sensorless locked rotor detector computer product, computing device, system, method, and apparatus may include or use computer program code executable on one or more central processing units or other processing devices to calculate locked rotor fault detection parameters for use in detecting locked rotor fault conditions. As such, the sensorless locked rotor detector may be implemented by way of executable program code stored within a non-transitory computer program. As used herein, the expression non-transitory will be understood to refer to the non-ephemeral nature of the storage medium itself rather than to a notion of how long the stored information itself may persist in a stored state. Accordingly, memories that might otherwise be viewed, for example, as being volatile (such as many electronically-erasable programmable read-only memories (EPROM's) or random-access memories (RAM's)) are nevertheless to be viewed here as being "non-transitory" whereas a signal carrier in transit is to be considered "transitory" notwithstanding that the signal may remain in transit for a lengthy period of time.). In other embodiments, the sensorless locked rotor detector may be implemented by microcontroller, microprocessor, advanced RISC machine (ARM) processor, field-programmable gate array (FPGA) and/or ad-hoc hardware (e.g., dedicated silicon solutions) in which the sensorless locked rotor detector algorithms are advantageously embodied for more efficient processing and improved computational performance.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, the term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting a rotor lock condition in a sensorless permanent magnet synchronous motor, comprising:

determining a first estimated back electromotive force (BEMF) voltage value in an estimated rotor-related reference frame using a Luenberger-based BEMF observer;

calculating a second estimated BEMF voltage value in a rotor-related reference frame based on at least a first motor constant and an estimated rotor speed $\hat{\omega}$;

generating a BEMF error filter value from the first and second estimated BEMF voltage values;

generating a BEMF error threshold value by calculating a product of a BEMF threshold coefficient ($C_{BEMFThresholdCoef}$) and an absolute value of the estimated rotor speed $\hat{\omega}$, subject to the minimum threshold BEMF value;

detecting a rotor lock condition in the sensorless permanent magnet synchronous motor based on at least the BEMF error filter value and the BEMF error threshold value; and discontinuing application of power to the sensorless permanent magnet synchronous motor upon detecting the rotor lock condition.

2. The method of claim 1, where determining the first estimated BEMF voltage value comprises computing a first estimated BEMF voltage value $\hat{e}_\delta$ as a $\delta$ coordinate in virtual rotating reference frame $(\gamma, \delta)$.

3. The method of claim 1, where calculating the second estimated BEMF voltage value comprises calculating a second estimated BEMF voltage value $\hat{e}_q = +c_{BemfCoef} \cdot \hat{\omega} + c_{BemfOffset} \cdot \text{sgn}(\hat{\omega})$ as a q coordinate in rotating reference frame (d,q), where $c_{BemfCoef}$ is a first BEMF coefficient term defined from a measurement on the motor, where $C_{BemfOffset}$ is a second BEMF offset coefficient defined from a measurement on the motor, and where the $\text{sgn}(\hat{\omega})$ term represents a sign function having a first output if $\hat{\omega} > 0$ and having a second output if $\hat{\omega} < 0$.

4. The method of claim 1, where generating the BEMF error filter value comprises filtering an absolute value of a difference between the first and second estimated BEMF voltage values.

5. The method of claim 4, where detecting the rotor lock condition comprises determining if an absolute value of the BEMF error filter value exceeds the BEMF error threshold value.

6. The method of claim 1, where generating the BEMF error filter value comprises filtering a difference between the first and second estimated BEMF voltage values.

7. The method of claim 6, where detecting the rotor lock condition comprises determining if an absolute value of the BEMF error filter value exceeds the BEMF error threshold value.

8. The method of claim 1, where generating the BEMF error filter value comprises filtering a squared difference between the first and second estimated BEMF voltage values.

9. The method of claim 8, where detecting the rotor lock condition comprises squaring the BEMF error threshold value to generate a squared BEMF error threshold value and determining if the BEMF error filter value exceeds the squared BEMF error threshold value.

10. The method of claim 1, where generating the BEMF error filter value comprises filtering a difference between the first and second estimated BEMF voltage values which is normalized by multiplying by a nonlinear scaling function before filtering.

11. The method of claim 10, where detecting the rotor lock condition comprises determining if an absolute value of the BEMF error filter value exceeds the BEMF error threshold value.

12. The method of claim 1, where generating the BEMF error filter value comprises filtering a squared difference between the first and second estimated BEMF voltage values which is normalized by multiplying by a nonlinear scaling function before power by two calculation.

13. The method of claim 12, where detecting the rotor lock condition comprises squaring the BEMF error threshold value to generate a squared BEMF error threshold value and determining if the BEMF error filter value exceeds the squared BEMF error threshold value.

14. The method of claim 1, where detecting the rotor lock condition comprises detecting if an absolute value of the estimated rotor speed value $\hat{\omega}$ falls below a minimum stall speed $(\omega_{StallMin})$.

15. An electric motor controller comprising:
a Luenberger-based back electromotive force (BEMF) observer for determining a first estimated BEMF voltage value in an estimated rotor-related reference frame and for determining an estimated rotor speed $\hat{\omega}$;
a processor coupled to the Luenberger-based BEMF EMF observer to calculate:
a second estimated BEMF voltage value in a rotor-related reference frame based on at least a first motor constant and the estimated rotor speed $\hat{\omega}$,
a BEMF error filter value based on a difference between the first and second estimated BEMF voltage values, and
a BEMF error threshold value $\hat{\omega}$ by calculating a product of a BEMF threshold coefficient ($C_{BEMFThresholdCoef}$) and an absolute value of the estimated rotor speed $\omega$, subject to the minimum threshold BEMF value; and
an electric motor driver circuit coupled to the processor for providing drive signals for controlling delivery of power to an electric motor;
where the processor is configured to detect if a rotor lock condition exists at the electric motor based on at least the BEMF error filter value and the BEMF error threshold value; and
wherein the processor is configured to cause the electric motor driver circuit to discontinue application of power to the electric motor upon detecting a rotor lock condition.

16. The electric motor controller of claim 15, wherein the Luenberger-based BEMF observer is configured to generate the first estimated BEMF voltage value by computing a first estimated BEMF voltage value $\hat{e}_\delta$ as a $\delta$ coordinate in virtual rotating reference frame $(\gamma, \delta)$.

17. The electric motor controller of claim 15, wherein the processor is configured to calculate the second estimated BEMF voltage value by calculating a second estimated BEMF voltage value $\hat{e}_q = +c_{BemfCoef} \cdot \hat{\omega} + c_{BemfOffset} \cdot \text{sgn}(\hat{\omega})$ as a q coordinate in rotating reference frame (d, q), where $c_{BemfCoef}$ is a first BEMF coefficient term defined from a measurement on the motor, where $C_{BemfOffset}$ is a second BEMF offset coefficient defined from a measurement on the motor, and where the $\text{sgn}(\hat{\omega})$ term represents a sign function based on whether the $\hat{\omega}$ is positive or negative.

18. The electric motor controller of claim 15, wherein the processor is configured to calculate the BEMF error filter value by filtering an absolute value of a difference between the first and second estimated BEMF voltage values.

19. The electric motor controller of claim 15, wherein the processor is configured to calculate the BEMF error filter value by filtering a difference between the first and second estimated BEMF voltage values.

20. The electric motor controller of claim 15, wherein the processor is configured to calculate the BEMF error filter value by filtering a squared difference between the first and second estimated BEMF voltage values.

21. A system for detecting locked rotor in a sensorless permanent magnet synchronous motor, comprising:
a Luenberger-based back electromotive force (BEMF) device for producing an estimated rotor speed $\hat{\omega}$ and a first estimated BEMF voltage value $\hat{e}_\delta$ as a $\delta$ coordinate in virtual rotating reference frame $(\gamma, \delta)$;
an estimator block coupled to receive the estimated rotor speed $\hat{\omega}$ from the Luenberger-based BEMF device for computing a second estimated BEMF voltage value comprises calculating a second estimated BEMF voltage values $\hat{e}_q = +c_{BemfCoef} \cdot \hat{\omega} + c_{BemfOffset} \cdot \text{sgn}(\hat{\omega})$ as a q coordinate in rotating reference frame (d,q), where $c_{BemfCoef}$ is a first BEMF coefficient term defined from a measurement on the motor, where $c_{BemfOffset}$ is a second BEMF offset coefficient defined from a measurement on the motor, and where the sgn($\hat{\omega}$) term represents a sign function having a first output if $\hat{\omega}>0$ and having a second output if $\hat{\omega}<0$;

a threshold block coupled to receive the estimated rotor speed $\hat{\omega}$ from the Luenberger-based BEMF device for computing a BEMF error threshold signal as a product of a BEMF threshold coefficient ($C_{BEMFThresholdCoef}$) and an absolute value of the estimated rotor speed $\hat{\omega}$, subject to a minimum threshold BEMF value;

a filtered back-EMF error block coupled to the Luenberger-based BEMF device and the estimator block for receiving the first estimated BEMF voltage value $\hat{e}_\delta$ and the second estimated BEMF voltage value $\hat{e}_q$, whereby the filtered back-EMF error block outputs a BEMF error filter signal indicative of a filtered comparison between the first estimated BEMF voltage value $\hat{e}_\delta$ and the second estimated BEMF voltage value $\hat{e}_q$; and fault handler coupled to the estimator block and threshold block for detecting a rotor lock condition at the sensorless permanent magnet synchronous motor based on at least the BEMF error filter signal and the BEMF error threshold signal; and discontinuing application of power to the sensorless permanent magnet synchronous motor upon detecting the rotor lock condition.

\* \* \* \* \*